(12) United States Patent
Arnone et al.

(10) Patent No.: US 9,460,521 B2
(45) Date of Patent: Oct. 4, 2016

(54) DIGITAL IMAGE ANALYSIS

(71) Applicant: ST-Ericsson SA, Plan-les-Ouates (CH)

(72) Inventors: Luigi Arnone, Brianza (IT); Paolo Vicari, Lonato del Garda (IT)

(73) Assignee: ST-ERICSSON SA, Plan-les-Ouates (CH)

( * ) Notice: Subject to any disclaimer, the term of this patent is extended or adjusted under 35 U.S.C. 154(b) by 67 days.

(21) Appl. No.: 14/404,982

(22) PCT Filed: Jun. 18, 2013

(86) PCT No.: PCT/EP2013/062613
§ 371 (c)(1),
(2) Date: Dec. 2, 2014

(87) PCT Pub. No.: WO2013/189925
PCT Pub. Date: Dec. 27, 2013

(65) Prior Publication Data
US 2015/0131902 A1 May 14, 2015

Related U.S. Application Data

(60) Provisional application No. 61/662,400, filed on Jun. 21, 2012.

(30) Foreign Application Priority Data

Jun. 18, 2012 (EP) .................................... 12172418

(51) Int. Cl.
*G06K 9/00* (2006.01)
*G06T 7/40* (2006.01)
(Continued)

(52) U.S. Cl.
CPC ............. *G06T 7/408* (2013.01); *G06K 9/4661* (2013.01); *H04N 1/6077* (2013.01);
(Continued)

(58) Field of Classification Search
CPC ...... H04N 1/60; H04N 1/603; H04N 1/6041; H04N 1/6077; H04N 1/6086; H04N 1/6088; H04N 5/2354; H04N 5/335; H04N 9/045; H04N 9/64; H04N 9/73; H04N 9/735; G06T 7/408; G06T 2207/10024; G06K 9/4652; G06K 9/4661; G09G 5/02; G09G 2323/0693; H02J 7/00; H03M 1/12; H03M 1/129

See application file for complete search history.

(56) References Cited

U.S. PATENT DOCUMENTS 6,038,339 A 3/2000 Hubel et al.
6,594,384 B1 * 7/2003 Kim ..................... G06K 9/4652
382/162

(Continued)

FOREIGN PATENT DOCUMENTS

JP 2006-153740 A 6/2006
WO 2014-016185 A1 1/2014

OTHER PUBLICATIONS

International Search Report issued in corresponding International application No. PCT/EP2013/062613, date of mailing Jan. 8, 2014.
(Continued)

*Primary Examiner* — Jose Couso
(74) *Attorney, Agent, or Firm* — Patent Portfolio Builders PLLC (57) ABSTRACT

The present invention provides a method for analyzing a digital image comprising a plurality of pixels representing a scene. The method comprising steps of obtaining pixel chromaticity information, providing, combinations each having a corresponding surface and a corresponding illuminant, performing a global scene surface-illuminant classification by determining hypothesis scores, accumulating hypothesis scores, thereby obtaining a global illuminant/surface statistic representing an estimate of a distribution of illuminants and/or surfaces in the scene as represented by the digital image. Other methods are also provided. Apparatuses for carrying out the methods are also provided.

17 Claims, 8 Drawing Sheets

(51) Int. Cl.
*G06K 9/46* (2006.01)
*H04N 1/60* (2006.01)
*H04N 9/73* (2006.01)

(52) U.S. Cl.
CPC ............. *H04N 1/6086* (2013.01); *H04N 9/73* (2013.01); *G06T 2207/10024* (2013.01); *G06T 2207/20076* (2013.01)

(56) References Cited

U.S. PATENT DOCUMENTS

| | | | | |
|---|---|---|---|---|
| 6,873,727 | B2* | 3/2005 | Lopez | H04N 1/6088 358/3.23 |
| 7,064,769 | B2* | 6/2006 | Speigle | H04N 1/6086 345/589 |
| 7,200,264 | B2* | 4/2007 | Hubel | H04N 9/735 348/223.1 |
| 7,227,586 | B2* | 6/2007 | Finlayson | H04N 9/735 348/223.1 |
| 7,616,810 | B2* | 11/2009 | Dolan | H04N 9/73 382/162 |
| 7,885,458 | B1 | 2/2011 | Lin | |
| 8,229,215 | B2* | 7/2012 | Li | H04N 1/6077 382/162 |
| 9,007,484 | B2* | 4/2015 | Zhang | H04N 9/73 348/233.1 |
| 9,013,596 | B2* | 4/2015 | Hong | H04N 5/2354 348/222.1 |
| 2003/0016865 | A1 | 1/2003 | Lopez et al. | |
| 2007/0024634 | A1 | 2/2007 | Speigle et al. | |
| 2010/0308921 | A1 | 12/2010 | Adamski et al. | |

OTHER PUBLICATIONS

Written Opinion of the International Searching Authority issued in corresponding International application No. PCT/EP2013/062613, date of mailing Jan. 8, 2014.

Finlayson, Graham D., et al., "Color by Correlation: A Simple, Unifying Framework for Color Constancy," IEEE Transactions on Pattern Analysis and Machine Intelligence, vol. 23, No. 11, Nov. 1, 2001, pp. 1209-1221, XP011093915, ISSN: 0162-8828, DOI: 10.1109/34.969113.

Gehler, Peter Vincent, et al., "Bayesian Color Constancy Revisited," IEEE Conference on Computer Vision and Pattern Recognition 2008 (CVPR 2008), Piscataway, NJ, USA, Jun. 23, 2008, pp. 1-8, XP031297323, ISBN: 978-1-4244-2242-5.

European Search Report issued in corresponding European application No. EP 12 17 8324, date of completion of the search Jan. 16, 2013.

Gerstenhaber, Moshe, et al., "ADC interface conditions high-level signals," EDN—Electrical Design News, vol. 48, Issue 24, p. 96, Oct. 30, 2003.

Volpi, Emilio et al., "Design of a high voltage fully differential driver for a double axis scanning micromirror," IEEE Conference on Research in Microelectronics and Electronics, Jul. 12-17, 2009, pp. 112-115, ISBN: 978-1-4244-3734-7.

* cited by examiner

DIGITAL IMAGE ANALYSIS

FIELD OF THE INVENTION

The present invention relates to a method and system for analyzing a digital image.

BACKGROUND OF THE INVENTION

Color reproduction accuracy is a key performance indicator of digital imaging systems, since color is one of the most relevant perceptual attributes that can be attached to an image, be it a photograph or a video clip. Differences in color rendition of images recorded from competing imaging devices like cameras, camcorders or camera phones, are apparent to most users and can result in significant differences in product or perceived brand quality.

In the human visual system, color is a percept, or sensation, deriving from a complex chain of biological processing steps, that starts with the collection of photons radiated from the various surfaces of a scene by means of the eye and provides the visual cortex with a brain map of spectral signatures that represent physical objects under illumination by various light sources.

Studies in vision physiology have long observed and studied the capability of living beings to recognize surfaces under widely varying illumination conditions. The radiation spectra reflected by physical surfaces have a dramatic variation depending on the spectrum of the illuminant they are lit by. Humans, for instance, are very capable in recognizing surfaces under varying lighting conditions, a capability that has been described as "color constancy" in the literature.

Even if humans have this capability, it is more satisfying for the visual perception if the there is only little or no difference between how one perceives a scene in real life and how it appears on an recording of the scene presented for instance on photo paper or a computer screen. Achieving accurate color reproduction in digital imaging systems requires, in a sense, emulating human vision color constancy, that is compensating the effects of the original scene illuminant in such a way that scene surfaces have the correct color appearance in the final image and viewing conditions. We shall indicate this function of a digital imaging system as "color balancing" in the following.

In practical digital imaging systems, the color balancing function is usually implemented by applying an appropriate color space transformation to the digital image color data captured by an imaging sensor. As a consequence of the above described dependency of light spectra reflected by physical surfaces on the spectrum of the illuminant(s), the color space transformation required for proper color rendition also has a significant dependency on the illuminant(s) under which the image is captured. This means that the color balancing parameters must be adapted, either manually or automatically, according to the scene illuminant(s).

The system and method according to the present invention is suitable for determining the scene illuminants by analyzing digital image data, and is therefore especially suitable for determining color balancing parameters, and performing color balancing in a digital imaging system, in such a way that color reproductions are perceived as realistic by observers.

Prior art systems might not reproduce colors in a way resembling what is observed by the eye. This is particularly the case under certain recording conditions, e.g. under certain types of artificial light, or when a scene is dominated by certain types of surfaces, like grass, sky or human skin. In such critical image recording conditions, images of grass, foliage or sky may be less saturated and faces may seem pale or greenish. It is a further object of the present invention to provide an alternative approach It is an object of the present invention to provide a system and method that in some cases can provide better color balancing than prior art systems.

SUMMARY OF THE INVENTION

In a first aspect, the invention provides method for analyzing a digital image, the digital image comprising a plurality of pixels representing a scene, the method comprising the steps of:
  obtaining pixel chromaticity information for a first set of pixels of the digital image;
  providing, for each surface-illuminant combination in a set of surface-illuminant combinations each having a corresponding surface and a corresponding illuminant, a corresponding reference chromaticity value representing a chromaticity corresponding to the corresponding surface of the surface-illuminant combination being illuminated by the corresponding illuminant of the surface-illuminant combination;
  performing a global scene surface-illuminant classification by:
    determining, for each pixel of the first set of pixels, a set of one or more hypothesis scores associated with a subset of the set of surface-illuminant combinations, each hypothesis score representing a degree of correspondence between the pixel chromaticity information for said each pixel and the reference chromaticity value associated with each of the one or more surface-illuminant combinations in the subset of surface-illuminant combinations;
    accumulating, for illuminants and/or surfaces occurring in the surface-illuminant combinations used in determining the hypothesis scores for the first set of pixels of the digital image, the determined hypotheses scores by illuminant and/or by surface, thereby obtaining a global illuminant/surface statistic representing an estimate of a distribution of illuminants and/or surfaces in the scene as represented by the digital image.

A "scene" in this context is a constellation of subjects, e.g. including a person, trees, sky, grass etc., as is well known, and being illuminated by a number of light sources. Colors of the various subjects should be reproduced as close to the "perceived" real world as possible. This means attempting to provide an image that persons will find is a good reproduction of the experience they get/got of the real scene. This is not to be considered a measure in the present invention as such, but is merely a statement of a desirable outcome after performing color correction. By varying parameters selected when employing the invention, the result may be perceived subjectively as changing to the better or to the worse, or not changing at all. The present invention can therefore, just like all other color correction approaches, provide color correction results of varying quality.

If any indication about the shooting context is available at runtime, classification robustness can be enhanced by exploiting this kind of a priori information. In a digital camera, contexts may for example be associated with selectable scene modes, e.g. beach, snow, foliage, portrait or the like. Knowing the setting that the image is recorded in may be used to eliminate certain illuminants, e.g. if the setting is 'beach' the likelihood that an incandescent light bulb affects the scene is likely very low.

The context information, for instance stored in a database, derives from statistical considerations regarding scenes and is therefore independent of the specific device used to capture the scene. This means that the efforts of building the database need to be spent once, and then the database contents can be applied in appropriate embodiments of the invention.

A context has associated probabilities that specific illuminant sources and specific surfaces are present in a scene of that context. The illuminant sources and surfaces associated with contexts may be limited to those most likely to occur so as to save data storage space and to improve execution performance. Given that the information is required during runtime, but not straightforward to create, it would be convenient to store it in a database.

In an embodiment local features are color measures extracted from the digital image data, and include a chromaticity map, $\underline{c}(X)$, comprising color information for a set $\underline{X}$ of image pixels coordinates, and they may also include a significance map $w(X)$, representing an estimate of the reliability of color measures for those image pixel coordinates. The set $X$ of spatial coordinates may comprise all image pixel coordinates from the image, or only a subset of them. The color measures for a pixel coordinate $\underline{x}$ can be computed from image data from the image pixel located at $\underline{x}$, or from a plurality of pixels in a neighborhood of $\underline{x}$. In the present context, chromaticity is defined as an approximately intensity-independent measure of color, for example a hue and saturation pair or any other equivalent measure that can be computed from input digital image data. For example, in case the input digital image is an RGB digital image, chromaticity may conveniently be represented by a normalized red and blue pair $(r, b)$, where $r=(R/G)$ is the ratio between the red (R) and green (G) channel values, and $b=(B/G)$ is the ratio between the blue (B) and green channel values, respectively. Note that the present invention does not rely on a specific definition of chromaticity, as the person skilled in the art will also readily recognize.

Some embodiments of the method further comprise defining a priori information about statistical distributions of image chromaticities conditioned to the occurrence of a certain surface illuminated by a certain illuminant. From now on this will be referred to as a surface-illuminant pair or combination. wherein global scene surface-illuminant estimation includes an approximation of local classification of scene surfaces and illuminants, based on a comparison between chromaticities of the digital image and reference chromaticities comprised in the second database, the for each surface the approximations being accumulated in a surface histogram of scene illuminant hypothesis scores. The second database is device dependent, in the sense that the reference chromaticities stored in the database depend on the optical and electronic characteristics of the image acquisition device type used for image capture, and must therefore be characterized every time a new image acquisition device type is used for an application of the method. The reference chromaticities in the second database can be further refined to take into account part-to-part variation by means of appropriate calibration methods.

In an embodiment the method further comprises statistical filtering of a surface histogram according to the a priori information from the first database and context, and the resulting weighted histograms are then combined into a single estimated scene illuminants distribution.

In an embodiment the scene illuminants in the set of contexts comprise possible scene illuminants and wherein the illuminants are divided into illuminant classes including light sources with continuous characteristics and light sources with discrete characteristics.

In an embodiment, illuminants classification includes determining the most likely illuminant from each illuminant class.

In an embodiment the scene surfaces in the set of contexts include surfaces modeled as reflecting surfaces being surfaces with variable chromaticity distributions and source surfaces being modeled as surfaces with invariant chromaticity distributions.

The explicit modeling of source surfaces improves the reliability of the classification part of the method because it reduces the risk of their misclassification as reflectances, which would affect scene illuminants estimation, and provides further useful context information. For example, the recognition of sky areas results in an increased likelihood of outdoor illuminants for the scene.

In an embodiment the set of contexts includes specific known image recording conditions having an a priori correlation with the statistics of scene illuminants and surfaces.

In an embodiment the digital image data comprises data from three different spectral bands. These bands could for instance represent red, green and blue channels of a digital image or digital video sequence.

In another aspect, the invention provides an apparatus for performing the method in according with the first aspect.

BRIEF DESCRIPTION OF THE FIGURES

The method and system according to the invention will now be described in more detail with regard to the accompanying figures. The figures show one way of implementing the present invention and is not to be construed as being limiting to other possible embodiments falling within the scope of the attached claim set.

FIG. 1 schematically illustrates a simplified system for color balancing of digital images, FIG. 2 schematically illustrates steps of a method according to the present invention, FIG. 3 schematically illustrates detailed steps of a part of a method according to the present invention, FIG. 4 schematically illustrates part of a system for color balancing of digital images, FIG. 5 schematically illustrates part of a system for color balancing of digital images, FIG. 6 schematically illustrates a second classification stage FIG. 7 schematically illustrate a graph specifying an a priori probability distribution for scene illuminants, FIG. 8 schematically illustrate sample data from a device chromaticities database, FIGS. 9 and 10 schematically illustrate an example of local features, FIGS. 11 and 12 schematically illustrates the outputs of the first classification stage, FIGS. 13 and 14 schematically illustrate the local outputs of the second classification stage, and FIGS. 15 and 16 schematically illustrate the global outputs of the second classification stage.

DETAILED DESCRIPTION OF AN EMBODIMENT

Figure 1:
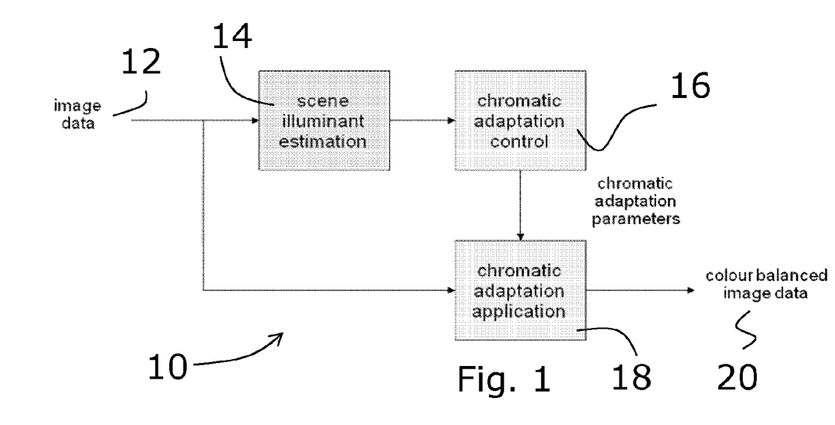

Most modern digital imaging system designs offer both manual and automatic color balancing control features, often indicated with terms like or similar to "manual white balance" and "auto white balance" in consumer digital cameras. A simplified general model of automatic color balancing control systems and method is illustrated in FIG. 1.

Digital image data 12 is analyzed by an illuminant estimation block that estimates the scene illuminant from the image data, the estimated illuminant is then fed into a color balancing control block 16 that computes an appropriate set of parameters for the chromatic balancing transformation, which is finally applied on the image data 12 by means of a chromatic adjustment block 18, to obtain color balanced image data 20.

An illuminant is a source of light with a given profile, i.e. a specific spectral power distribution.

It has been found that while the application of chromatic adjustment is in principle a straightforward task, the computation of the appropriate parameters is not simple, since it fundamentally requires estimating the scene illuminants from image data that have strong, joint dependency on both the scene illuminant and the scene surfaces, which are a priori unknown, and can therefore behave as clutter signals in the estimation of the scene illuminant. One type illuminant shining on one subject may give off light similar to that resulting when another type of illuminant illuminates different subject.

A further difficulty stems from the fact that real scenes are often lit by multiple illuminants rather than by just one. For example, outdoor scenes captured on a clear day typically comprise (not necessarily an exhaustive list): sunlit areas illuminated by the sun, the sky, and light from shadow areas, illuminated only by the sky; in a similar way, indoor scenes captured near a window often comprise areas lit by artificial light sources, such as bulbs or fluorescent lamps, and areas lit by window light. In both cases, very different light spectra are coexisting in the same scene. This complicates the illuminant estimation task, especially if a single one is assumed, and introduces the question of how to define a global chromatic adaptation transformation for image areas lit by different illuminants. In the present context global refers to the entire image.

It is nowadays more and more common for consumer digital imaging devices, like cameras and camera phones, to feature the so-called "intelligent auto" or "smart auto" shooting modes. In general, these names refers to an advertised capability of the device to analyze the scene that is being captured (and perhaps its capture conditions), and then automatically choose a set of optimized image processing settings that ensure the best possible rendition of the original scene.

A rationale behind the introduction of such "intelligent auto" features can be found in the fact that first-generation "auto" control designs have been increasingly found to be too basic to cope well with some common shooting conditions, including beach or snow shots, night portraits, indoor shots of moving people or animals etc. Since a fully automatic recognition of such shooting conditions was not feasible due to technological reasons, devices with special manual options, often referred to as "scene modes", were introduced, starting from low-tier consumer and progressively climbing up to the semi-pro market, to back up the weak auto control systems with human suggestions about the shooting context.

As digital processing technology advances, the possibility for a digital camera to have some degree of understanding of the scene being captured and of the shooting context is becoming a reality, paving the way for a new breed of more intelligent digital cameras that can select an appropriate "scene mode" in an automatic way, according to the detected context. This kind of feature, often called "automatic scene detection" in the marketing material, should allow users of digital imaging devices to enjoy the benefits of scene modes in terms of image rendition quality without the need to worry about manual options.

Current consumer devices are in reality capable of recognizing only a few scene types, and reliability remains a significant issue.

The present invention provides a computationally efficient method for a joint classification of scene illuminants and scene surfaces that enable estimation of, at the same time, the illuminants of a scene and the surfaces that the scene comprises. The method is capable of recognizing multiple illuminants and multiple surfaces in the same scene, and can be easily trained to recognize new illuminants or surfaces. The method may also easily be optimized for specific shooting contexts, if any shooting context information is available at runtime.

Figure 2:
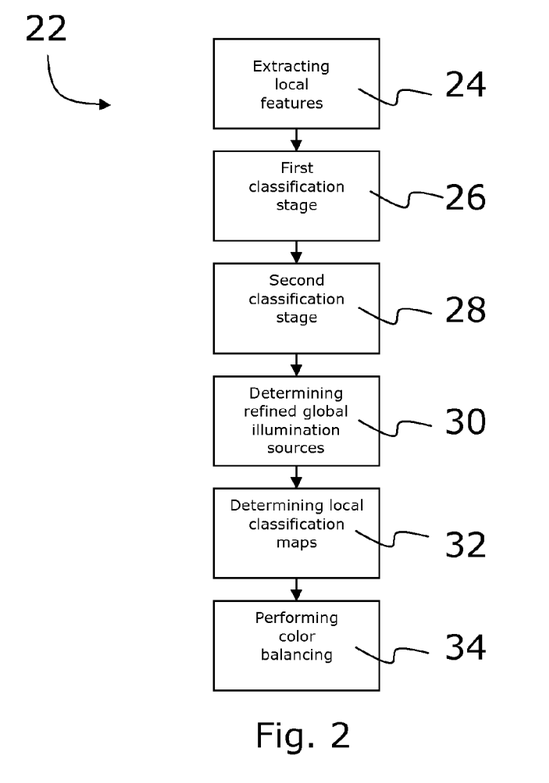

FIG. 2 schematically illustrates steps of a method 22 for processing a digital image, where the digital image comprises a plurality of pixels representing a scene. Initially a set of contexts relating scene illuminants to scene surfaces is provided. The method 22 comprises the step of extracting 24 from the digital image local features, the local features including chromaticity information from the digital image. The method 22 comprises the step of performing a first classification stage 26 comprising:

performing first global scene illuminants estimation, for determining type of illuminants in the scene, based on the extracted local features and the set of contexts.

The method 22 comprises the step of performing 28 a second classification stage based on the first global scene illuminants estimation and the extracted local features, the second classification stage 28 comprising:

performing local illuminants classification, for estimating the type of illuminants based on the first global scene illuminants estimation and the extracted local features, performing local surface classification based on the first global scene illuminants estimation and the extracted local features, performing a second global scene illuminants estimation based on the local illuminants classification and local surface classification.

The method 22 can comprise the step of determining 30 a refined global illuminants estimate based on the first global scene illuminants estimation and the second global scene illuminants estimation. The method 22 comprises the step of determining local classification maps 32 for detected scene illuminants and scene surfaces. The method 22 in this example comprises the step of performing color balancing 34 of image data based on the refined global illuminants estimate and local classification maps for detected scene illuminants and surfaces to the digital image. This step is not essential for the invention, but would be a typical application for the classification of scene illuminants obtained with the present method.

Figure 3:
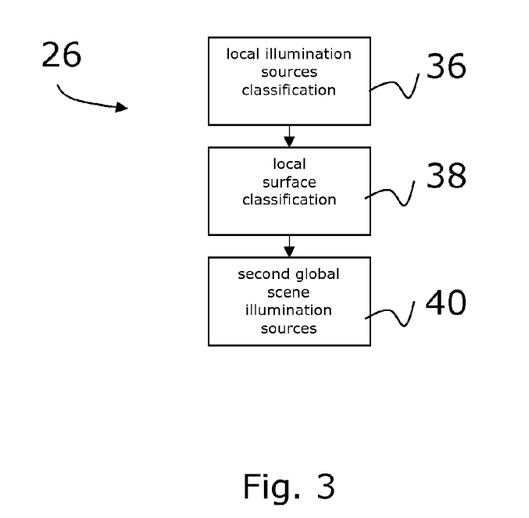

FIG. 3 schematically illustrate steps of the second classification stage 28 in detail the steps performed comprises performing local illuminants classification 36, for estimating the type of illuminants based on the first global scene illuminants estimation and the extracted local features. The second classification stage 28 comprises performing local surface classification 38 based on the first global scene illuminants estimation and the extracted local features. The second classification stage 28 comprises performing a second global scene illuminants estimation 40 based on the local illuminants classification and local surface classification.

36+38: Local illuminants and surfaces classification

The present invention may be implemented in the control software of a digital imaging system, such as a mobile phone, camera or video camera, and provides a joint solution to the two problems illustrated above: illuminant estimation, for automatic color balance control, and surface classification, for automatic scene detection. Although the invention finds a natural use in the consumer digital imaging device industry, it can be applied in all fields that require a fast and reliable local classification of scene contents from incoming image data, for example augmented reality, surveillance, robot vision, autonomous vehicle guidance etc.

Figure 4:
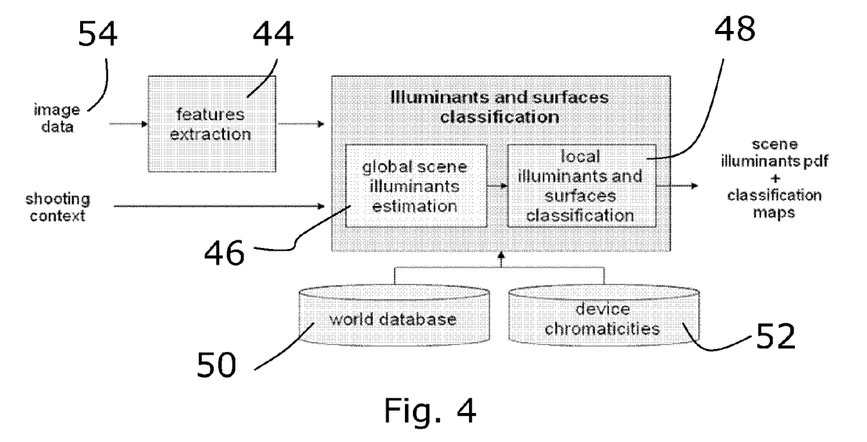

FIG. 4 schematically illustrates a system 42 implementing part of the method according to the present invention. A pre-processing block 44, the 'Features extraction', extracts the local features that will be used for classification from incoming image data. The local features used preferably include chromaticity information. A first classification stage 46 (Global scene illuminants estimation) analyzes the extracted local features and outputs a global estimation of scene illuminants, and then a second classification stage 48 (Local illuminants and surfaces classification) produces the final global illuminants estimate, plus local classification maps for detected scene illuminants and surfaces. Both classification stages base their decisions on a set of a priori information extracted from a training database, the device chromaticities 52, and on runtime shooting context information, if available.

The various elements in the high level block diagram, and system and method steps discussed above, are described in more detail below.

Image data 54 indicates the incoming image data resulting from the digital capture of a scene, in any suitable pixel format. The only assumption made on the image data is that it has at least three channels, corresponding to different spectral bands, e.g. red, green and blue. Further it is assumed that the channels are sampled approximately in the same spatial positions (small sampling phase differences, like those found in images from Bayer pattern sensors, are acceptable). The channels may for instance be Red, Green and Blue, but other suitable channels may be used.

Features extraction 44 indicates the operation of extracting from incoming image data the information that is used for classification, which in a presently preferred embodiment comprises the two spatial maps, the chromaticity map $\underline{c}(\underline{x})$, comprising color information, and the significance map $w(\underline{x})$, comprising an estimate of how reliable the chromaticity map is at all image coordinates.

The world database 50 comprises a set of a priori statistical information about possible scene illuminants and scene surfaces in a set of possible contexts, and is an important contribution to the robustness to the classification method.

The information in the world database is organized as follows:

An illuminants set I, comprising possible scene illuminants. The illuminants set is partitioned in illuminant classes, including light sources with homogeneous characteristics, such as blackbody illuminants, fluorescent illuminants, LED illuminants, xenon illuminants and so on. The method considers both continuous classes, in theory comprising an infinite number of illuminants, including the class of blackbody illuminants, and discrete classes, comprising a finite set of illuminants, including for example a set of fluorescent lamps from a specific family. For example, the class of blackbody illuminants in the 2000-20000 Kelvin range includes an infinite number of illuminants, each one identified by a different color temperature, as color temperature is a continuous space.

A partitioning into homogeneous illuminant classes combined with hypothesis selection heuristics results in a significant saving of computational complexity for the method.

A surfaces set S, comprising possible scene surfaces. In an embodiment the classification method considers two classes of surfaces: reflectances, modeled as surfaces with variable chromaticity distributions, due to the dependency on the scene illuminants, and sources, modeled as surfaces with an invariant chromaticity distribution, such as the sky.

A set of contexts are specific known shooting conditions, as for example indoor, outdoor, snow, beach and so on, that have an a priori correlation with the statistics of scene illuminants and surfaces, such as the sun, snow, clouds etc.

A statistical model of scene illuminants and surfaces specifying, for the various contexts, a priori probability distributions for the possible scene illuminants and for the possible scene surfaces. This statistical model allows the present methods to provide a reliable classification in cases of ambiguity.

The device chromaticities database 52 comprises a priori information about the statistical distributions of image chromaticities, conditioned to the occurrence of possible illuminant and surface pairs. In particular, this database specifies the nominal device chromaticities $\underline{c}(i, s)$ with illuminant $i \in I$ and surface $s \in S$, corresponding to the centroids of chromaticity distributions conditioned to all pairs $(i, s)$. The spreads of chromaticity distributions around the nominal points depend both on measurement uncertainties, due to acquisition noise and device part-to-part variations, and to actual variability of surface spectral characteristics, due to physical reasons.

The information in the device chromaticities database 52 derives from statistical characteristics of actual device image data, and therefore requires specific training on each imaging device. However, it is possible to devise automated methods and tools to characterize new devices rapidly and efficiently.

The aim of the first stage is to estimate the global distribution of scene illuminants, starting from an approximate local classification of scene surfaces and illuminants, based on a comparison between image chromaticities and the references comprised in the device chromaticities database. This first local classification can be considered a fuzzy classification since multiple classification hypotheses (i.e. multiple hypotheses for a surface and illuminant pair) are generated and evaluated for each image coordinate, and a histogram of scene illuminant hypothesis scores is accumulated for each surface. Further details on the hypothesis generation and evaluation process are given elsewhere.

It is noted that local surface and illuminant classification is complicated by the fact that more than one combination of a reflectance surface and an illuminant may produce the same chromaticity response in a given imaging device, due to the fact that chromaticity depends on both factors. For example, many imaging sensors used in consumer devices respond with similar chromaticities to a gray surface lit by incandescent light and to a human skin surface lit by cool white fluorescent light, respectively. Therefore, in the absence of a priori information, it is not in general easy, or even sometimes not possible, to achieve a unique local classification based on chromaticity alone.

Figures 5, 6:
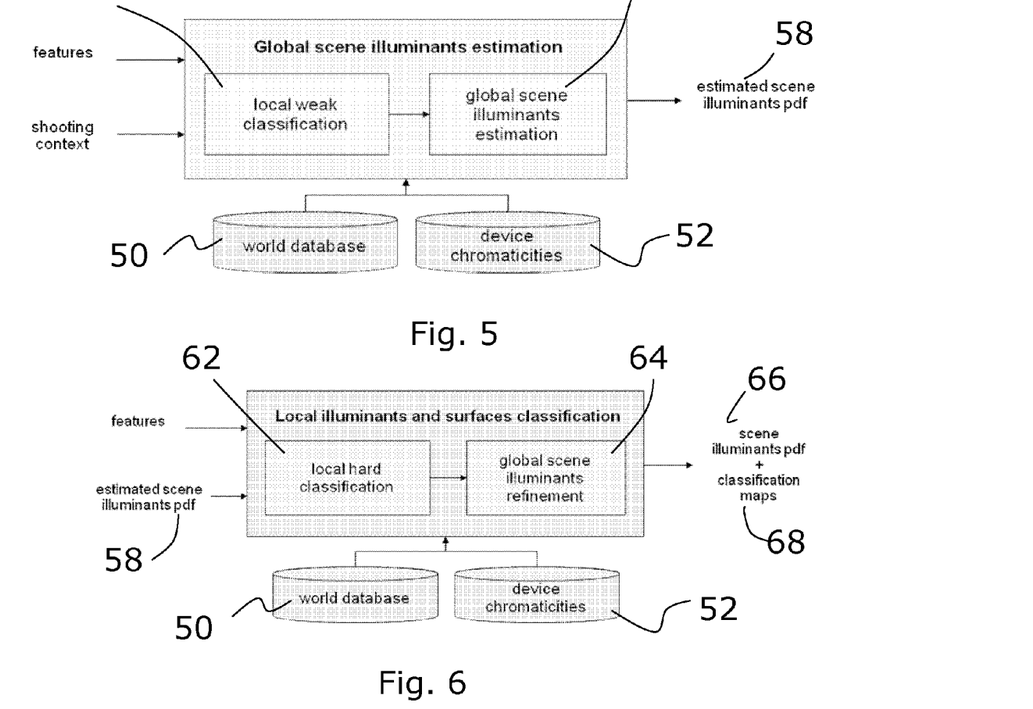

FIG. 5 illustrates the first classification stage 53. In FIG. 5 the first classification step is indicated as a Local weak classification 54 because the method does not rely on its local accuracy but only on its average local accuracy and in this embodiment this stage does not attempt to produce any surface or illuminants classification maps.

Figure 11:
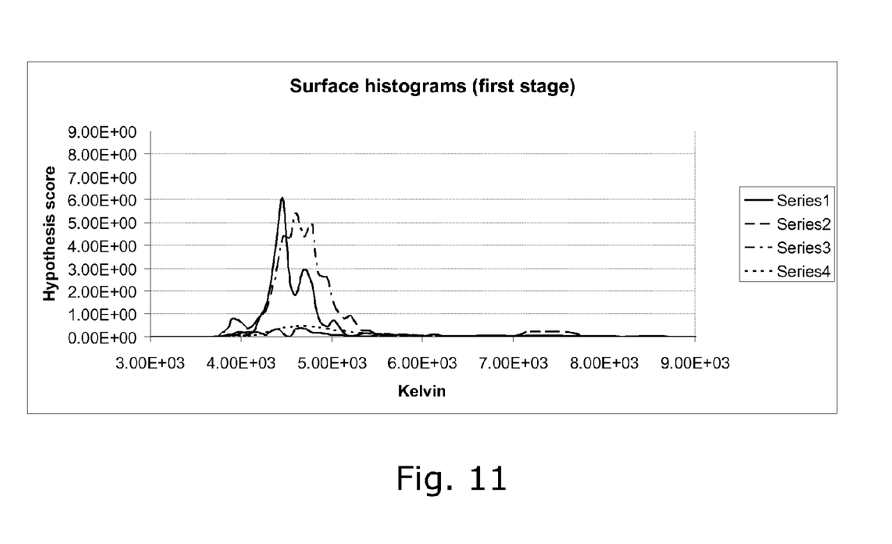
Figure 12:
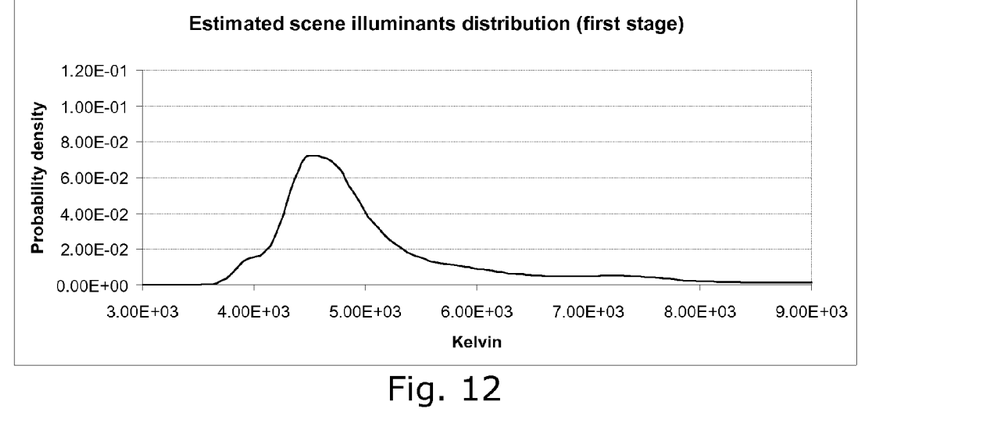

During the subsequent Global scene illuminants estimation step 56, statistical filtering operations are applied to surface histograms according to the a priori information from the world database 50 and context, and the resulting filtered histograms are then combined into a single estimated scene illuminants distribution indicated by the letters pdf and the reference numeral 58 in the diagram in FIG. 5. Examples of histograms are illustrated in FIGS. 11 and 12.

Despite the fuzziness of the first local classification 54, the statistical filtering based on the world database 50 leads to a considerable stabilization of the estimated scene illuminants distribution 58. Actually, for applications of the present method where only global color balancing is required, and no local classification is needed, it is possible to use the scene illuminants distribution estimate at the output of the first stage directly for computing an approximate global color balancing transformation, as explained in a subsequent section of this document.

Following the first classification stage 53 illustrated in FIG. 5 a second classification stage 60 is performed, as illustrated in FIG. 6. The aim of the second stage 60 is to produce a detailed local classification of surfaces and illuminants for each image position, and to further refine the scene illuminants distribution estimate coming from the first stage 53. The second stage 60 is structurally similar to the first stage, in the sense that it involves a local classification 62 based on image chromaticities and the device chromaticities database, followed by a global scene illuminants classification step 64.

However the local classification 62 in the second classification stage is a hard classification, as opposed to a fuzzy one, in the sense that only a single classification hypothesis (i.e. the hypothesis of a surface and illuminant pair with the highest score) is selected for each image coordinate, and the estimated scene illuminants distribution 58 coming from the first stage is used as a priori information instead of the equivalent information from the world statistics database 50. The second stage 60 produces full spatial maps of classified surfaces and illuminants 66, plus a map 68 comprising an estimate of the reliability of the classification at each image position.

The classification maps 68 at the output of the second stage are typically accurate enough for automated scene detection uses, as long as the surfaces set S includes most (ideally all) of the surfaces of interest, and that the scene does not comprise significant coverage from unknown surfaces that appear to have the same chromaticities as some known ones. In the latter case, the unknown surfaces may be misclassified as known ones. The present method reduces the likelihood of such misclassifications thanks to the filtering of local classification hypotheses against the global scene illuminants distribution estimate coming from the first stage.

The local hard classifications are accumulated into histograms in a similar way to the first stage 53, so that the final Global scene illuminants refinement 64 step can combine them into a final scene illuminants distribution estimate 66 that is also an output of the second classification stage.

Below further details are provided on the hypothesis generation and evaluation process that is at the heart of the local classification steps in both the first and second stages. In other words, the process that allows generating and evaluating the various illuminant and surface hypotheses for a single image position, starting from the local observed chromaticity and significance, is described.

A heuristic assumption that allows to significantly reduce the computational complexity of the proposed method in practical embodiments is also described.

In principle, the proposed classification method requires generating all possible illuminant and surface hypotheses for each image position and attaching a score to each hypothesis, so that the best hypothesis is either accumulated with a larger weight (fuzzy classification in the first stage) or selected as the final image position classification (hard classification in the second stage). The score attached to each hypothesis can be computed from the following data:

The a priori probabilities of the hypothesized surface and illuminant (from the world database and runtime context).

The distance of the observed local chromaticity from the nominal chromaticity for the hypothesized surface and illuminant pair (from the device chromaticities database).

The significance of the observed local chromaticity.

Despite the simplicity of the operations, the computational complexity of generating and evaluating of all possible illuminant and surface hypotheses for an image position is linear in both the number of hypothesized surfaces and in the number of hypothesized illuminants, and in particular tends to explode as the number of hypothesized illuminants is progressively increased.

However, under the heuristic assumption that each image position is lit by at most one illuminant from each illuminant class, the complexity of the hypothesis generation and evaluation process can be considerably reduced, provided that an efficient method exists to determine the most likely illuminant of each hypothesized class. Under this assumption, in fact, a single illuminant hypothesis, i.e. the most likely, is considered for each illuminant class, and the complexity is only linear in the number of hypothesized illuminant classes as opposed to the number of hypothesized illuminants.

The above heuristical assumption holds well in real scenes, and the proposed classification method is robust to local violations due to the stabilizing effect of the global classification steps.

The next paragraph provides an example of how the above heuristic enables the proposed method to generate and evaluate a single illuminant hypothesis from a continuous illuminant class comprising an infinite number of illuminants.

Here continuous illuminant sources are discussed. One noteworthy example of a continuous illuminant class is the set of blackbody illuminants in a range of color temperatures. Blackbody illuminants are excellent models of natural light sources, like sunlight, daylight and skylight, and have the important property that their spectra can be generated as regular functions of a single parameter, namely the color temperature.

The above mentioned spectral regularity property of blackbody illuminants is mapped into an analogous regularity property of surface chromaticities generated when a given surface, imaged through a given device, is lit by blackbody illuminants with increasing color temperatures. More precisely, as color temperature is increased, surface chromaticities follow a regular line (a geometrical locus) in the device chromaticity space, so that every chromaticity point along the locus of the given surface is bi-univocally associated to a single blackbody illuminant color temperature. The proposed classification method exploits the geometrical regularity of surface loci in device chromaticity spaces to significantly reduce the computational complexity of the hypothesis generation and evaluation process for the blackbody illuminants class, as described below.

During the device training phase the following steps are performed, not necessarily in the given sequence:

A reduced representative set of blackbody illuminants is selected.

The nominal device chromaticities of all surfaces under each selected blackbody illuminant are characterized.

A suitable continuous geometrical model of the true chromaticity locus of each surface is built from the characterized chromaticities, considering them as "key points". In practice this requires the identification of an appropriate interpolation function in chromaticity space.

A function or lookup table that maps each point of a chromaticity locus into the corresponding blackbody illuminant color temperature is generated.

All the relevant data is stored in the device chromaticities database.

Steps performed during the runtime hypothesis generation and evaluation process for the blackbody illuminant class, for a given image position and surface, not necessarily in the given sequence:

The nearest point of the chromaticity locus of the hypothesized surface is identified (for example by geometrical projection onto the locus model).

The color temperature of the corresponding blackbody illuminant is estimated by accessing the mapping function or lookup table.

The blackbody illuminant with the estimated color temperature is assumed to be the only blackbody illuminant affecting the given image position.

The corresponding hypothesis score is computed based on the above assumption.

The above described heuristics and simplifications allow the proposed method to handle infinite blackbody illuminant hypotheses in a computationally tractable way, without degrading the detection of true blackbody scene illuminants.

Figure 7:
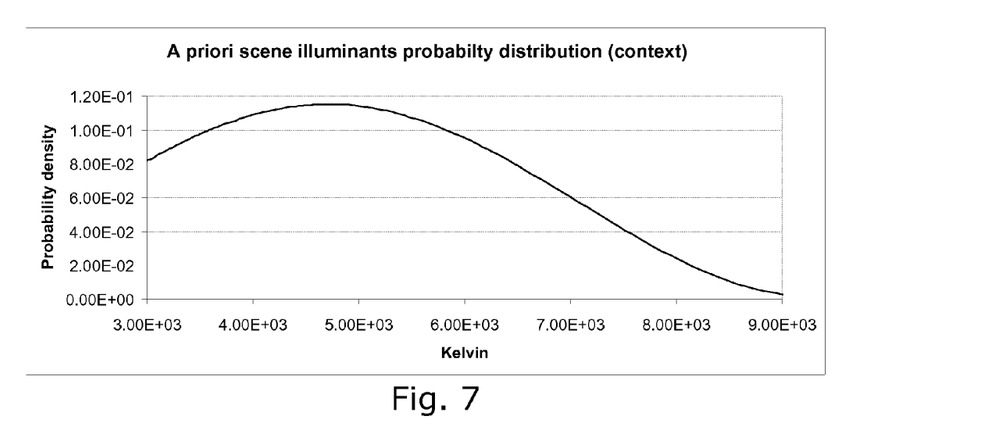

FIG. 7 schematically illustrates a graph specifying an a priori probability distribution for scene illuminants for an example context, the horizontal axis is color temperature in kelvin, while the vertical axis is a probability density value. This type of probability distribution refers to the class of blackbody illuminants, where color temperatures in a specified range are infinitely many. Other illuminants classes, for example fluorescent illuminants, may be finite, and the probability distributions would then be discrete, not illustrated here.

Below is a table providing examples of how to specify an a priori likelihood distribution for scene surfaces in a specific context (in the table, likelihoods are expressed as numbers in the 0-100 range).

|  | Surface1 | Surface2 | Surface3 | Surface4 |
|---|---|---|---|---|
| Indoor | 100 | 50 | 50 | 10 |
| Outdoor | 75 | 75 | 100 | 75 |
| Landscape | 50 | 100 | 20 | 50 |
| Beach | 50 | 100 | 50 | 50 |
| Snow | 100 | 20 | 100 | 100 |

Figure 8:
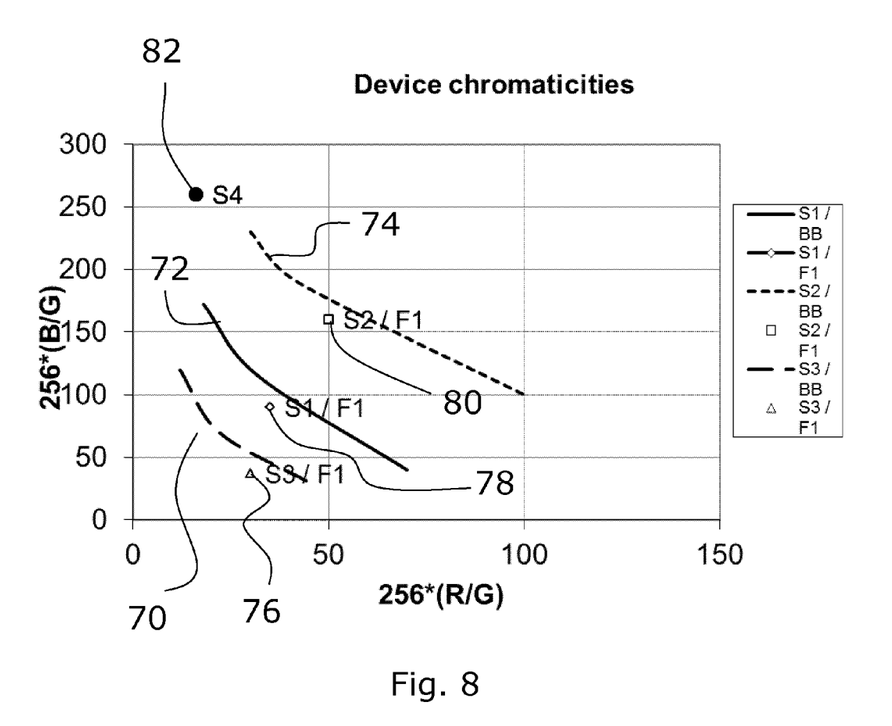

FIG. 8 schematically illustrates sample data from a device chromaticities database. Lines 70, 72, 74 in the diagram represent chromaticities of each reflecting surface (S1-S3) under blackbody illuminants (BB) in the color temperature range of interest. Also illustrated are single points 76, 78, 80 on the diagram representing chromaticities of each reflecting surface (S1-S3) under a non-blackbody illuminant of interest (F1).

The circle 82 at the top-left part of the diagram represents the invariant chromaticity of a source surface (S4).

Figure 9:
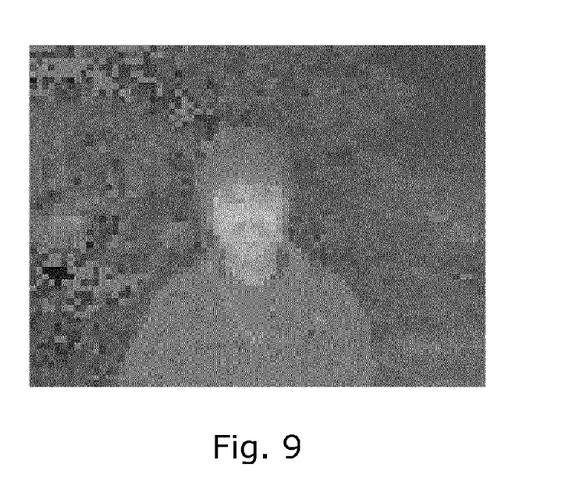
Figure 10:
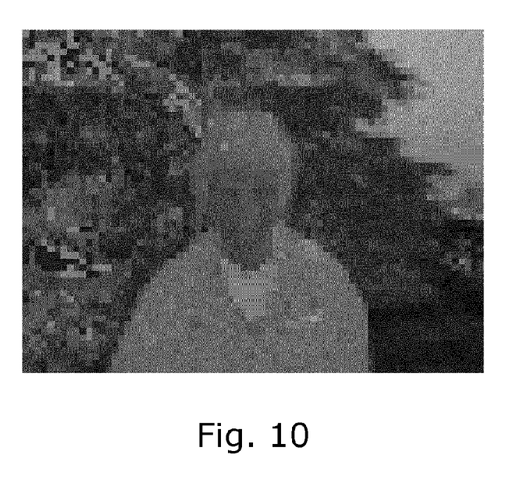

FIGS. 9 and 10 schematically illustrate an example of local features, i.e. a chromaticity map, as used for classification operations. In this example, the input image is an RGB digital image, and chromaticity is defined as a normalized red and blue pair (r, b), where r=(R/G) is normalized red and b=(B/G) is normalized blue. FIG. 9 represents the first channel of the chromaticity map, here normalized red, and FIG. 10 represents the second channel of the chromaticity map, here normalized blue. In this embodiment, chromaticity channels are normalized with respect to the green channel. FIG. 10b is a color image representing the two normalized channels. However, since the colors may not be reproduced correctly in a copy of this document, FIGS. 9 and 10 are provided to show normalized chromaticities for the two channels, in a gray scale.

FIGS. 11 and 12 schematically illustrate the outputs of the first classification stage. Each curve on the diagram of FIG. 11 represents an estimate of the distribution of scene illuminants color temperatures, conditioned to the hypothetical presence of a given scene surface. The horizontal axis of the diagram is color temperature, measured in Kelvin, while the vertical axis is cumulated score for each surface-illuminant hypothesis. Similar estimates are generated for all non-blackbody illuminants of interest. The higher peaks indicate combinations of surface/illuminant pairs that are likely to actually be present in the captured scene. The curve illustrated in the diagram of FIG. 12 represents the overall estimate of the distribution of scene illuminants, computed by consolidating all surface histograms and filtering against the context a priori probability distribution.

Figure 13:
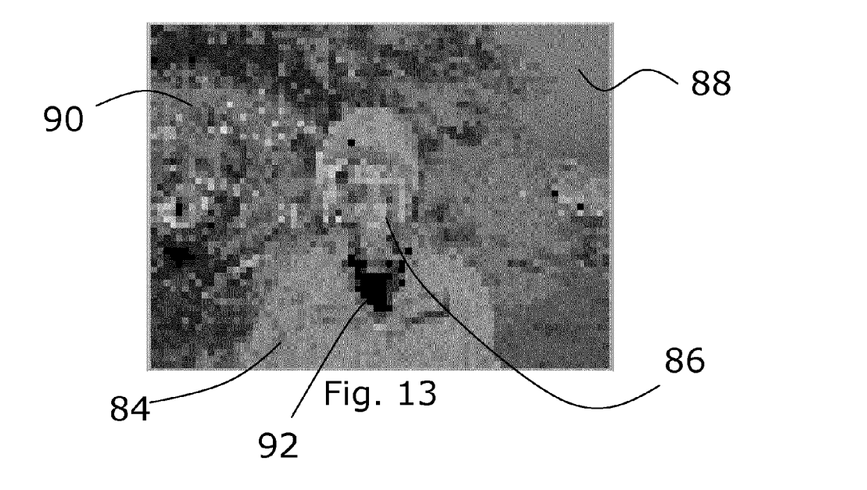
Figure 14:
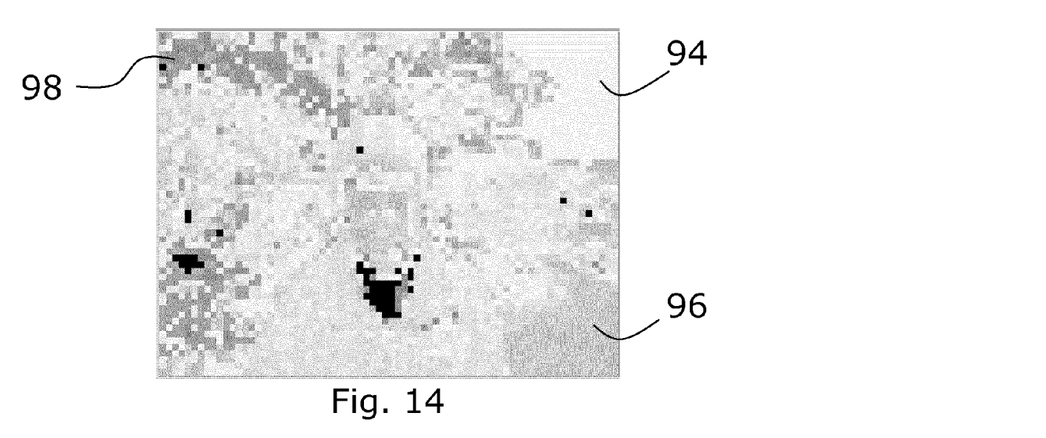

FIGS. 13 and 14 illustrate the local outputs of the second classification stage. FIG. 13 illustrates a representation of the local surface classification map where, for example, gray 84 indicates neutral surfaces, pink 86 indicates human skin, blue 88 indicates sky, and green 90 indicates foliage, the black 92 indicates unclassified points. For the sake of clarity of the figure not all areas are provided with a reference numeral.

FIG. 14 represents the local illuminants classification map, where white 94 indicates color temperatures around 5000 kelvin, the orange 96 color indicates lower estimated color temperatures, the blue 98 color indicates higher estimated color temperatures. The surfaces and illuminants in the scene are classified accurately enough to support automatic scene detection schemes in consumer imaging devices. For the sake of clarity of the figure not all areas are provided with a reference numeral.

Figure 15:
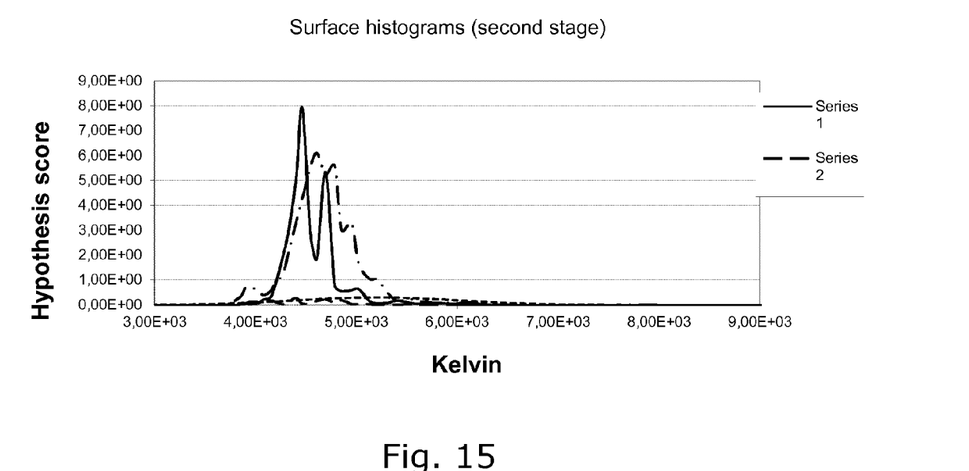
Figure 16:
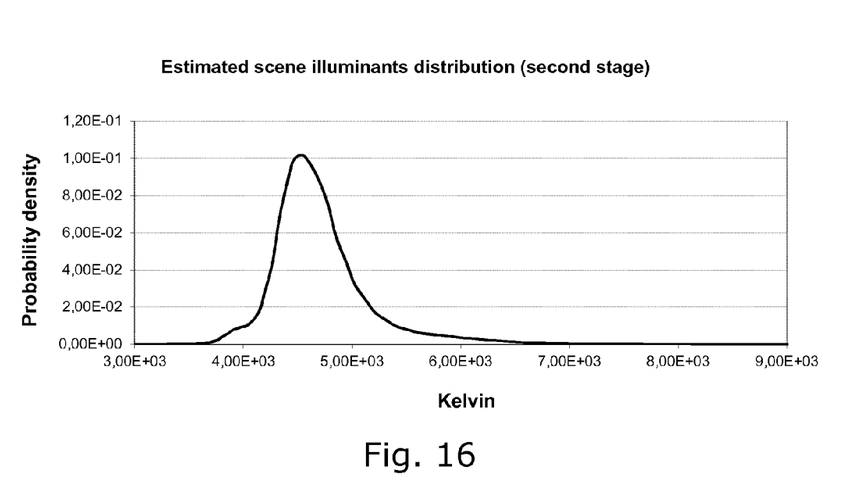

FIGS. 15 and 16 illustrate the global outputs of the second classification stage. In FIG. 15 each curve represents an estimate of the distribution of scene illuminants color temperatures, conditioned to the detection of a given scene surface, according to the local surface classification. The horizontal axis is color temperature, measured in Kelvin, while the vertical axis is cumulated score for each surface-illuminant hypothesis. Similar estimates are generated for all non-blackbody illuminants of interest.

In FIG. 16 the curve represents the overall final estimate of the distribution of scene illuminants, computed by consolidating all surface histograms and filtering against the estimated scene illuminants distribution coming from the previous stage.

The final global classification is less disperse, and more reliable, thanks to the reduction of surface classification ambiguities present in the first global classification.

It is well known to a person skilled in the art that knowledge of the presence of an illuminant in a scene represented by a digital image can be readily used to compute a chromatic adaptation transformation which compensates the effects of the scene illuminant, to the end of mapping the images of scene subjects into the proper colors. This kind of operation is commonly referred to as a "color balancing" transformation, and is often described (and practically implemented) as a combination of a "white balancing" transformation, which maps the images of gray objects into gray colors, and a "color correction" transformation, which corrects the mapping of non-gray objects. However, the distinction between these transformations is not relevant in the scope of this explanation, since the knowledge of the presence of a scene illuminant allows computing appropriate parameters for any of these transformations. For this reason, in many applications that require automatic color balancing, color balancing parameter sets for all illuminant types of interest are pre-computed offline and stored in a database, and an appropriate parameter set is then selected at run time, according to the dominant scene illuminant type detected by a global scene illuminant detection method. However, in cases where multiple illuminants are present in the same scene, global illuminant detection methods can become unreliable, and the selection of a single color balancing parameter set based on the dominant scene illuminant can be inappropriate for the image areas affected by non-dominant illuminants.

The capability of the present method to provide an estimate of the distribution of scene illuminants, rather than a simple detection of the dominant one, allows computing an average chromatic adaptation, which compensates, on average, the effects of all scene illuminants detected as present, so that a more accurate color balancing is performed in the image areas affected by non-dominant illuminants. This can be accomplished, for example, by computing a weighted average of the color balancing parameter sets associated all detected illuminants, using the estimated distribution of scene illuminants as the weighting function.

In addition to this, the capability of the present method to provide a local estimate of scene illuminants, it is even possible to compute different color balancing parameters for the different parts of an image, in order to attenuate or remove the residual local differences in color rendition due to the effects of different illuminants affecting different parts of the scene, that are still present in the output image if only global color balancing is performed. The color balancing may be used for still images or digital video images. Further the method and system may be used as a sub-system where the result of this system is used as input for further processing.

The invention claimed is:

1. A method for analyzing a digital image, the digital image comprising a plurality of pixels representing a scene, the method comprising the steps of:
    obtaining pixel chromaticity information for a first set of pixels of the digital image;
    providing, for each surface-illuminant combination in a set of surface-illuminant combinations each having a corresponding surface and a corresponding illuminant, a corresponding reference chromaticity value representing a chromaticity corresponding to the corresponding surface of the surface-illuminant combination being illuminated by the corresponding illuminant of the surface-illuminant combination;
    performing a global scene surface-illuminant classification by:
        determining, for each pixel of the first set of pixels, a set of one or more hypothesis scores associated with a subset of the set of surface-illuminant combinations, each hypothesis score representing a degree of correspondence between the pixel chromaticity information for said each pixel and the reference chromaticity value associated with each of the one or more surface-illuminant combinations in the subset of surface-illuminant combinations, wherein the hypothesis scores for each pixel includes a single hypothesis score for each of at least two illuminant classes having homogenous characteristics, wherein the at least two illuminant classes include a class of light sources with continuous characteristics and a class of light sources with discrete characteristics;
        accumulating, for illuminants and/or surfaces occurring in the surface-illuminant combinations used in determining the hypothesis scores for the first set of pixels of the digital image, the determined hypotheses scores by illuminant and/or by surface, thereby obtaining a global illuminant/surface statistic representing an estimate of a distribution of illuminants and/or surfaces in the scene as represented by the digital image.

2. A method in accordance with claim 1, wherein one or more hypothesis scores are dependent on an expected surfaces distribution in the scene.

3. A method in accordance with claim 1, wherein one or more hypothesis scores are dependent on an expected illuminants distribution in the scene.

4. A method in accordance with claim 1, wherein one or more hypothesis scores are dependent on an expected surfaces distribution and an expected illuminants distribution in the scene.

5. A method in accordance with claim 1, wherein one or more hypothesis scores are dependent on one or more expectances that one or more surface-illuminant combinations are present in the scene.

6. A method in accordance with claim 2, wherein the expected surfaces distribution is dependent on a context of the scene, including one of or a combination of two or more of: an outdoor scene; an indoor scene; a daylight scene; a nighttime scene; a city light scene; a beach scene; a forest scene; a fireworks scene.

7. A method in accordance with claim 3, wherein the expected illuminants distribution is dependent on a context of the scene, including one of or a combination of two or more of: an outdoor scene; an indoor scene; a daylight scene; a nighttime scene; a city light scene; a beach scene; a forest scene; a fireworks scene.

8. A method in accordance with claim 5, wherein the expectances that one or more surface-illuminant combinations are present in the scene is dependent on a context of the scene indicated by a scene mode selected when the digital image was captured.

9. A method for analyzing a digital image, the digital image comprising a plurality of pixels representing a scene, the method comprising the steps of:
    obtaining pixel chromaticity information for a first set of pixels of the digital image;
    providing, for each surface-illuminant combination in a set of surface-illuminant combinations each having a corresponding surface and a corresponding illuminant, a corresponding reference chromaticity value representing a chromaticity corresponding to the corresponding surface of the surface-illuminant combination being illuminated by the corresponding illuminant of the surface-illuminant combination;

performing a global scene surface-illuminant classification by:

determining, for each pixel of the first set of pixels, a first set of one or more hypothesis scores associated with a first subset of the set of surface-illuminant combinations, each hypothesis score of the first set representing a degree of correspondence between the pixel chromaticity information for said each pixel and the reference chromaticity value associated with each of the one or more surface-illuminant combinations in the subset of surface-illuminant combinations;

accumulating, for illuminants and/or surfaces occurring in the surface-illuminant combinations used in determining the first set of hypothesis scores for the first set of pixels of the digital image, the determined hypotheses scores by illuminant and/or by surface, thereby obtaining a global illuminant/surface statistic representing an estimate of a distribution of illuminants and/or surfaces in the scene as represented by the digital image;

performing a local scene illuminants-surfaces classification by:

determining, for each pixel of the set of pixels using the estimate of the distribution of illuminants and/or surfaces in the scene as represented by the digital image from the global scene surface illuminant classification, a second set of one or more hypothesis scores associated with a second subset of the set of surface-illuminant combinations, each hypothesis score of the second set representing a degree of correspondence between the pixel chromaticity information for said each pixel and the reference chromaticity value associated with each of the one or more surface-illuminant combinations in the subset of surface-illuminant combinations;

determining, for each pixel of the first set of pixels, a highest hypothesis score in the second set of one or more hypothesis scores determined for said each pixel, thereby obtaining a local classification map comprising a best representative surface-illuminant combination for said each pixel.

10. The method according to claim 1, further comprising:
performing color balancing of a second set of pixels of the digital image based on the global illuminant-surface statistic or based on local classification map.

11. The method according to claim 1, further comprising:
performing scene detection for the digital image, based on the global illuminant-surface statistic or based on local classification map.

12. The method according to claim 1, wherein local features include a significance map including an estimate of the reliability of the chromaticity map at all image positions.

13. The method according to claim 1, wherein the surfaces include reflecting surfaces modeled as surfaces with variable chromaticity distributions and source surfaces modeled as surfaces with an invariant chromaticity distribution.

14. A method for analyzing a digital image, the digital image comprising a plurality of pixels representing a scene, the method comprising the steps of:

obtaining pixel chromaticity information for a first set of pixels of the digital image;

performing a first classification stage, comprising estimating first global scene illuminants in the scene based on the pixel chromaticity information and a set of contexts, wherein the set of contexts include, for each surface-illuminant combination in a set of surface-illuminant combinations each having a corresponding surface and a corresponding illuminant, a corresponding reference chromaticity value representing a chromaticity corresponding to the corresponding surface of the surface-illuminant combination being illuminated by the corresponding illuminant of the surface-illuminant combination;

performing, based on the estimated first global scene illuminants and the pixel chromaticity information, a second classification stage, comprising performing local illuminants classification by estimating a type of illuminants based on the estimated first global scene illuminates and the pixel chromaticity information;

performing local surface classification based on the estimated first global scene illuminants and the pixel chromaticity information;

performing a second global scene illuminants estimation based on the local illuminants classification and the local surface classification; and determining a refined global illuminants estimate based the first global scene illuminants estimation and the second global scene illuminants estimation.

15. The method of claim 14, further comprising:
determining local classification maps for detected scene illuminants and scene surfaces; and
color balancing the digital image based on the refined global illuminants estimate and the determined local classification maps for the detected scene illuminants and scene surfaces.

16. The method of claim 15, wherein the first and second classification stages use a set of predetermined information from a training database and information regarding chromaticities of a device that captured the digital image.

17. The method of claim 14, wherein the chromaticity information is obtained by extraction from the digital image to form a chromaticity map and a significance map is obtained from the digital image data, wherein the significance map comprises an estimate of reliability of the chromaticity map at each of the first set of pixels.

* * * * *